(12) United States Patent
Aydin et al.

(10) Patent No.: US 7,436,095 B2
(45) Date of Patent: Oct. 14, 2008

(54) ROTARY ELECTRIC MACHINE

(75) Inventors: Metin Aydin, Peoria, IL (US); Mustafa K. Guven, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 74 days.

(21) Appl. No.: 11/261,619

(22) Filed: Oct. 31, 2005

(65) Prior Publication Data

US 2007/0096579 A1    May 3, 2007

(51) Int. Cl.
 *H02K 1/27* (2006.01)
 *H02K 21/12* (2006.01)
(52) U.S. Cl. .................................. 310/156.53
(58) Field of Classification Search ................
 310/156.36–156.43, 156.53–156.57
 See application file for complete search history.

(56) References Cited

U.S. PATENT DOCUMENTS

| | | | |
|---|---|---|---|
| 3,696,260 A | 10/1972 | Lace | |
| 3,721,844 A | 3/1973 | Fong | |
| 3,979,821 A | 9/1976 | Noodleman | |
| 4,139,790 A | 2/1979 | Steen | |
| 4,308,479 A | 12/1981 | Richter | |
| 4,469,970 A | 9/1984 | Neumann | |
| 4,472,651 A | 9/1984 | Jones | |
| 4,506,181 A | 3/1985 | Jones et al. | |
| 4,510,680 A | 4/1985 | Miller et al. | |
| 4,525,925 A | 7/1985 | Jones | |
| 4,658,165 A | 4/1987 | Vanderschaeghe | |
| 4,692,646 A | 9/1987 | Gotou | |
| 4,916,346 A | 4/1990 | Kliman | |
| 4,918,831 A | 4/1990 | Kliman | |
| 4,924,130 A | 5/1990 | Fratta | |
| 5,038,065 A * | 8/1991 | Matsubayashi et al. | ..... 310/162 |
| 5,091,668 A | 2/1992 | Cuenot et al. | |
| 5,097,166 A | 3/1992 | Mikulic | |
| 5,117,553 A | 6/1992 | Kliman | |
| 5,159,220 A | 10/1992 | Kliman | |
| 5,187,401 A | 2/1993 | Rahman | |
| 5,191,256 A | 3/1993 | Reither, Jr. et al. | |

(Continued)

FOREIGN PATENT DOCUMENTS

EP    0 678 967 A1    10/1995

(Continued)

*Primary Examiner*—Tran Nguyen
(74) *Attorney, Agent, or Firm*—Finnegan, Henderson, Farabow, Garrett & Dunner

(57) ABSTRACT

A rotor for an electric machine includes a rotor core constructed of magnetically-permeable material and a permanent-magnet cluster that creates a magnetic pole of the rotor. The permanent-magnet cluster may be composed of permanent magnets mounted to the rotor core, including a first permanent magnet, a second permanent magnet, a third permanent magnet, and a fourth permanent magnet. The second permanent magnet may have a first end disposed adjacent a first end of the first permanent magnet, with a first portion of the rotor core disposed therebetween. Additionally, the third permanent magnet may have a first end disposed adjacent a second end of the first permanent magnet, with a second portion of the rotor core disposed therebetween. The fourth permanent magnet may form at least a portion of an outer perimeter of the rotor core and may be disposed radially outward of at least a portion of at least one of the first permanent magnet, the second permanent magnet, and the third permanent magnet.

20 Claims, 3 Drawing Sheets

U.S. PATENT DOCUMENTS

| | | | |
|---|---|---|---|
| 5,331,245 A | 7/1994 | Burgbacher et al. | |
| 5,418,416 A | 5/1995 | Müller | |
| 5,475,277 A * | 12/1995 | Johnson | 310/156.19 |
| 5,500,994 A | 3/1996 | Itaya | |
| 5,510,662 A | 4/1996 | Tanimoto et al. | |
| 5,554,900 A | 9/1996 | Pop, Sr. | |
| 5,627,423 A | 5/1997 | Marioni | |
| 5,663,605 A | 9/1997 | Evans et al. | |
| 5,818,140 A | 10/1998 | Vagati | |
| 5,898,253 A | 4/1999 | El-Antably et al. | |
| 5,936,322 A * | 8/1999 | Yamaguchi et al. | 310/156.19 |
| 5,945,758 A | 8/1999 | Goltz et al. | |
| 5,945,760 A | 8/1999 | Honda et al. | |
| 6,008,559 A | 12/1999 | Asano et al. | |
| 6,034,458 A | 3/2000 | Uetake et al. | |
| 6,066,904 A | 5/2000 | Fei et al. | |
| 6,072,256 A | 6/2000 | Shon et al. | |
| 6,084,496 A | 7/2000 | Asano et al. | |
| 6,087,751 A | 7/2000 | Sakai | |
| 6,121,706 A | 9/2000 | Nashiki et al. | |
| 6,133,662 A * | 10/2000 | Matsunobu et al. | 310/156.53 |
| 6,198,372 B1 | 3/2001 | Schwarz | |
| 6,218,753 B1 | 4/2001 | Asano et al. | |
| 6,225,724 B1 | 5/2001 | Toide et al. | |
| 6,239,525 B1 | 5/2001 | Matsunobu et al. | |
| 6,239,526 B1 | 5/2001 | Oh et al. | |
| 6,259,181 B1 | 7/2001 | Kawano et al. | |
| 6,271,613 B1 | 8/2001 | Akemakou et al. | |
| 6,271,616 B1 | 8/2001 | Akemakou | |
| 6,285,104 B1 | 9/2001 | Nashiki | |
| 6,300,703 B1 | 10/2001 | Kawano et al. | |
| 6,329,734 B1 * | 12/2001 | Takahashi et al. | 310/156.56 |
| 6,335,582 B1 * | 1/2002 | Abukawa et al. | 310/214 |
| 6,340,857 B2 | 1/2002 | Nishiyama et al. | |
| 6,342,745 B1 | 1/2002 | Sakai et al. | |
| 6,351,050 B1 | 2/2002 | Coles | |
| 6,353,275 B1 | 3/2002 | Nishiyama et al. | |
| 6,423,386 B2 | 6/2002 | Iwasaki et al. | |
| 6,427,534 B2 | 8/2002 | D'Amico et al. | |
| 6,448,680 B1 | 9/2002 | Akemakou | |
| 6,462,451 B1 | 10/2002 | Kimura et al. | |
| 6,486,581 B2 | 11/2002 | Miyashita et al. | |
| 6,552,462 B2 | 4/2003 | Sakai et al. | |
| 6,555,940 B2 | 4/2003 | Naito et al. | |
| 6,597,079 B2 | 7/2003 | Miyashita et al. | |
| 6,630,762 B2 | 10/2003 | Naito et al. | |
| 6,664,688 B2 * | 12/2003 | Naito et al. | 310/156.01 |
| 6,674,205 B2 | 1/2004 | Biais et al. | |
| 6,675,460 B2 | 1/2004 | Reiter, Jr. et al. | |
| 6,707,206 B2 * | 3/2004 | Chang | 310/156.08 |
| 6,713,926 B2 | 3/2004 | Wauke | |
| 6,741,002 B2 | 5/2004 | Nishiyama et al. | |
| 6,794,784 B2 | 9/2004 | Takahashi et al. | |
| 6,849,983 B2 | 2/2005 | Tajima et al. | |
| 6,884,513 B2 | 4/2005 | Kikugawa et al. | |
| 6,891,298 B2 | 5/2005 | Gary | |
| 6,906,444 B2 * | 6/2005 | Hattori et al. | 310/156.53 |
| 6,940,196 B2 | 9/2005 | Gysin | |
| 2001/0028201 A1 | 10/2001 | Miyshita et al. | |
| 2001/0043020 A1 | 11/2001 | Nishiyama et al. | |
| 2002/0041127 A1 | 4/2002 | Naito et al. | |
| 2002/0041128 A1 | 4/2002 | Nishiyama et al. | |
| 2002/0047409 A1 | 4/2002 | Hiroyuki et al. | |
| 2002/0047432 A1 | 4/2002 | Miyashita et al. | |
| 2002/0117923 A1 | 8/2002 | Takei | |
| 2003/0052561 A1 | 3/2003 | Rahman et al. | |
| 2003/0062790 A1 | 4/2003 | Reiter, Jr. et al. | |
| 2003/0137203 A1 | 7/2003 | Chang | |
| 2003/0164655 A1 | 9/2003 | Biais et al. | |
| 2003/0168925 A1 | 9/2003 | Bemreuther et al. | |
| 2003/0209950 A1 | 11/2003 | Biais et al. | |
| 2004/0017123 A1 | 1/2004 | Miyashita et al. | |
| 2004/0251759 A1 | 12/2004 | Hirzel | |
| 2005/0225192 A1 | 10/2005 | Kloepzig et al. | |

FOREIGN PATENT DOCUMENTS

| | | |
|---|---|---|
| EP | 0 809 343 B1 | 11/1997 |
| EP | 0 909 003 A2 | 4/1999 |
| EP | 0 909 003 A3 | 4/1999 |
| EP | 1 014 542 A2 | 6/2000 |
| EP | 1 014 542 A3 | 6/2000 |
| EP | 1 028 047 A2 | 8/2000 |
| EP | 1 123 576 B1 | 8/2001 |
| EP | 1 139 548 A2 | 10/2001 |
| EP | 1 300 208 A2 | 4/2003 |
| EP | 1 139 548 A3 | 10/2003 |
| EP | 1361641 | 11/2003 |
| JP | 58-029359 | 2/1983 |
| JP | 09-023598 | 1/1997 |
| JP | 10051984 A * | 2/1998 |
| JP | 11243653 A * | 9/1999 |
| JP | 2000-166145 | 6/2000 |
| JP | 2000-253608 | 9/2000 |
| JP | 2000-316241 | 11/2000 |
| JP | 2001-145283 | 5/2001 |
| JP | 2002-354728 | 12/2002 |
| JP | 2004-64887 | 2/2004 |

* cited by examiner

ROTARY ELECTRIC MACHINE

TECHNICAL FIELD

The present disclosure relates to electric machines having a stator and a rotor and, more particularly, to electric machines having a rotor that includes permanent magnets.

BACKGROUND

Many electric machines, such as electric motors and electric generators, include a stator that is held stationary and a rotor that rotates adjacent the stator. The stator and rotor may be configured to transfer power between one another through one or more rotating magnetic fields. Some electric machines may include a permanent-magnet type rotor with permanent magnets mounted on or inside a rotor core of the rotor. Each permanent magnet of the rotor may individually create a north or south magnetic pole of the rotor. A permanent-magnet type rotor having only a single permanent magnet creating each of its magnetic poles may, however, limit the performance potential of the associated electric machine.

U.S. Pat. No. 6,664,688 to Naito et al. ("the '688 patent") shows a rotor with each of its magnetic poles created by a group of permanent magnets. Each group of permanent magnets of the '688 patent includes an outer permanent magnet disposed in a recess in an outer surface of a rotor core. Additionally, each group of permanent magnets of the rotor disclosed by the '688 patent includes two arc-shaped inner permanent magnets mounted in cavities in the rotor core. Inner ends of the two inner permanent magnets are disposed adjacent one another, radially inward of the outer permanent magnet of the group. Outer ends of the two inner permanent magnets of each group are disposed at the outer surface of the rotor on opposite sides of the outer permanent magnet. A relatively thin portion of the rotor core between the inner ends of the two inner permanent magnets provides the only connection between a portion of the rotor core disposed radially outward of the two inner permanent magnets and other portions of the rotor core.

Although each of the magnetic poles of the rotor of the '688 patent is created by multiple permanent magnets, certain disadvantages persist. For example, the relatively narrow portion of the rotor core that extends between the inner ends of the two inner permanent magnets may be subjected to undesirably high stresses during rotation of the rotor. Rotation of the rotor may create centrifugal force on the portion of the rotor core disposed radially outward the inner permanent magnets. In order to keep the rotor core intact, the relatively thin portion of the rotor core between inner ends of the two inner permanent magnets must counteract all of the centrifugal force on the portion of the rotor core disposed radially outward of the two inner permanent magnets. Additionally, the shape of the outer permanent magnet and the cavity in which it is mounted may make the outer permanent magnet susceptible to detachment from the rotor core during high-speed rotation of the rotor. Furthermore, because they are arc-shaped, the two inner permanent magnets may be expensive.

The electric machine and rotor of the present disclosure solve one or more of the problems set forth above.

SUMMARY OF THE INVENTION

One disclosed embodiment relates to a rotor for an electric machine. The rotor may include a rotor core constructed of magnetically-permeable material and a permanent-magnet cluster that creates a magnetic pole of the rotor. The permanent-magnet cluster may be composed of permanent magnets mounted to the rotor core, including a first permanent magnet, a second permanent magnet, a third permanent magnet, and a fourth permanent magnet. The second permanent magnet may have a first end disposed adjacent a first end of the first permanent magnet, with a first portion of the rotor core disposed therebetween. Additionally, the third permanent magnet may have a first end disposed adjacent a second end of the first permanent magnet, with a second portion of the rotor core disposed therebetween. The fourth permanent magnet may form at least a portion of an outer perimeter of the rotor core and may be disposed radially outward of at least a portion of at least one of the first permanent magnet, the second permanent magnet, and the third permanent magnet.

Another embodiment relates to a rotor for an electric machine. The rotor may include a rotor core constructed of magnetically-permeable material and a plurality of permanent magnets mounted to the rotor core. The plurality of permanent magnets mounted to the rotor core may include a permanent-magnet cluster that creates a magnetic pole of the rotor. The permanent-magnet cluster may include at least one outer permanent magnet that forms at least a portion of an outer perimeter of the rotor. At least a portion of the rotor core may overlap at least a portion of the outer permanent magnet. Additionally, the permanent-magnet cluster may include at least one inner permanent magnet, wherein at least a portion of the inner permanent magnet is disposed radially inward of the outer permanent magnet.

A further disclosed embodiment relates to an electric machine. The electric machine may include a rotor that is rotatable about a rotor rotation axis. The rotor may include a rotor core constructed of a magnetically-permeable material. The rotor core may include a first cavity, the first cavity having a curved first end and a second end. The second end of the first cavity may be disposed closer to an outer perimeter of the rotor than the first curved end, and the first curved end may be wider than the second end. Additionally, the rotor core may include a second cavity, at least a portion of the second cavity being disposed adjacent the first curved end of the first cavity. The rotor may also include a first permanent magnet disposed in the first cavity and a second permanent magnet disposed in the second cavity.

DETAILED DESCRIPTION

Figure 1:
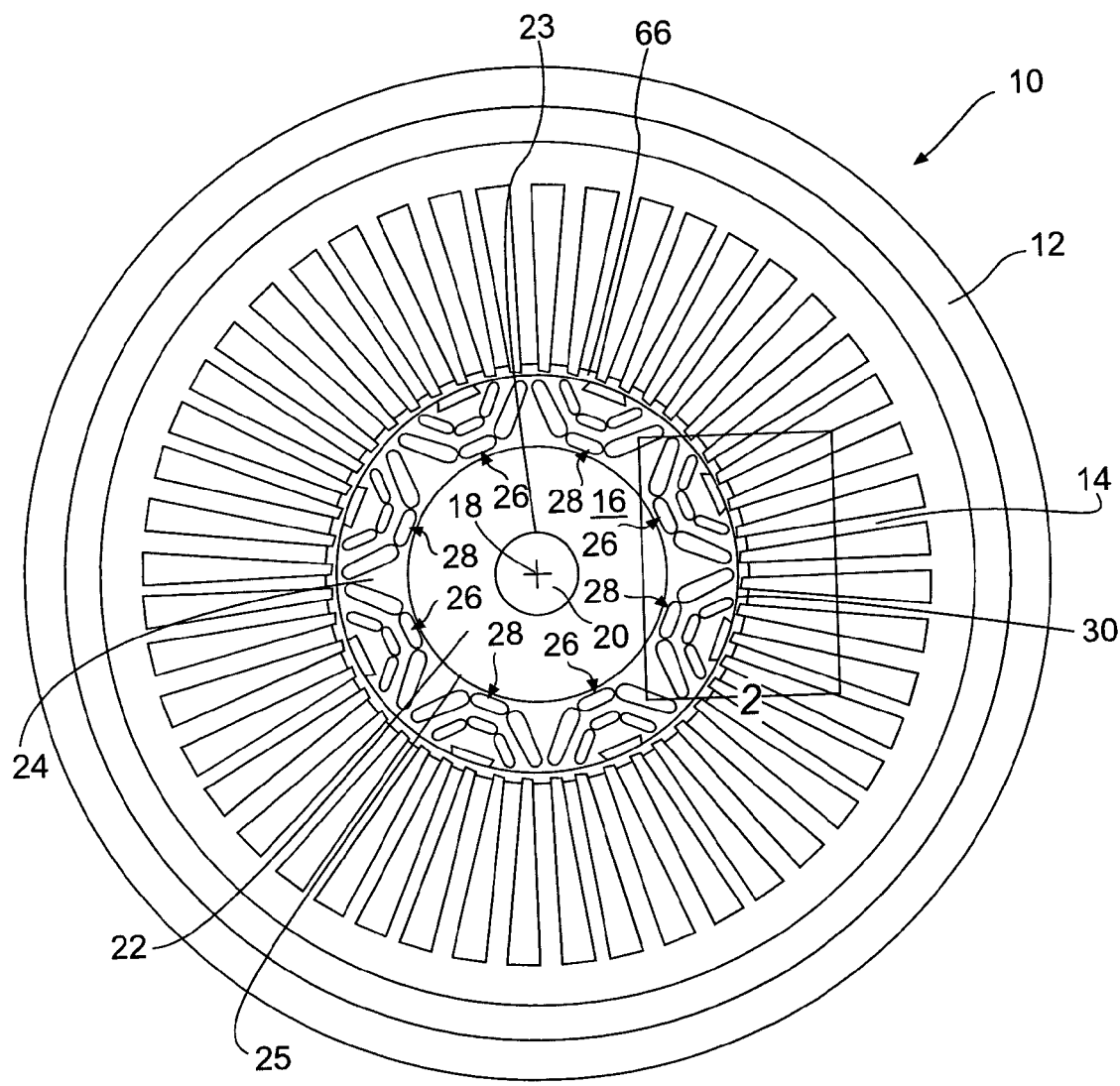
FIG. 1 is a sectional illustration of one embodiment of an electric machine according to the present invention.

FIG. 1 illustrates one embodiment of an electric machine 10 according to the present disclosure. Electric machine 10 may be configured to operate as an electric motor and/or an electric generator. Electric machine 10 may include a housing 12, a stator 14, and a rotor 16.

Housing 12 may provide support for stator 14 and rotor 16. Rotor 16 may be supported by housing 12 in such a manner that rotor 16 may rotate about a rotor rotation axis 18. Housing 12 may support stator 14 in a stationary position adjacent rotor 16. As FIG. 1 shows, in some embodiments, stator 14 may extend around rotor rotation axis 18 and rotor 16, with an annular air gap 66 between an outer perimeter 30 of rotor 16 and stator 14.

Stator 14 may include windings of an electrical conductor (not shown), such as wire. Such windings of an electrical conductor may be operable to receive electricity from an electrical power source to produce a rotating magnetic field adjacent rotor 16.

Rotor 16 may include a rotor shaft 20, a rotor hub 22, and a rotor core 24. Rotor hub 22 may be constructed of a material with a relatively low permeability to magnetic flux. Rotor hub 22 may extend around rotor shaft 20 at a shaft/hub interface 23. Rotor core 24 may be constructed of a material having a relatively high permeability to magnetic flux, such as a ferrous metal. Rotor core 24 may extend around rotor hub 22 at a hub/core interface 25.

Rotor 16 may also include permanent magnets mounted to rotor core 24, and some or all of these permanent magnets may be arranged in permanent-magnet clusters 26, 28. Permanent-magnet clusters 26 and permanent-magnet clusters 28 may be arranged in alternating positions around outer perimeter 30 of rotor 16. As will be described in greater detail below, permanent-magnet clusters 26 may create north magnetic poles of rotor 16, and permanent-magnet clusters 28 may create south magnetic poles of rotor 16.

Figure 2:
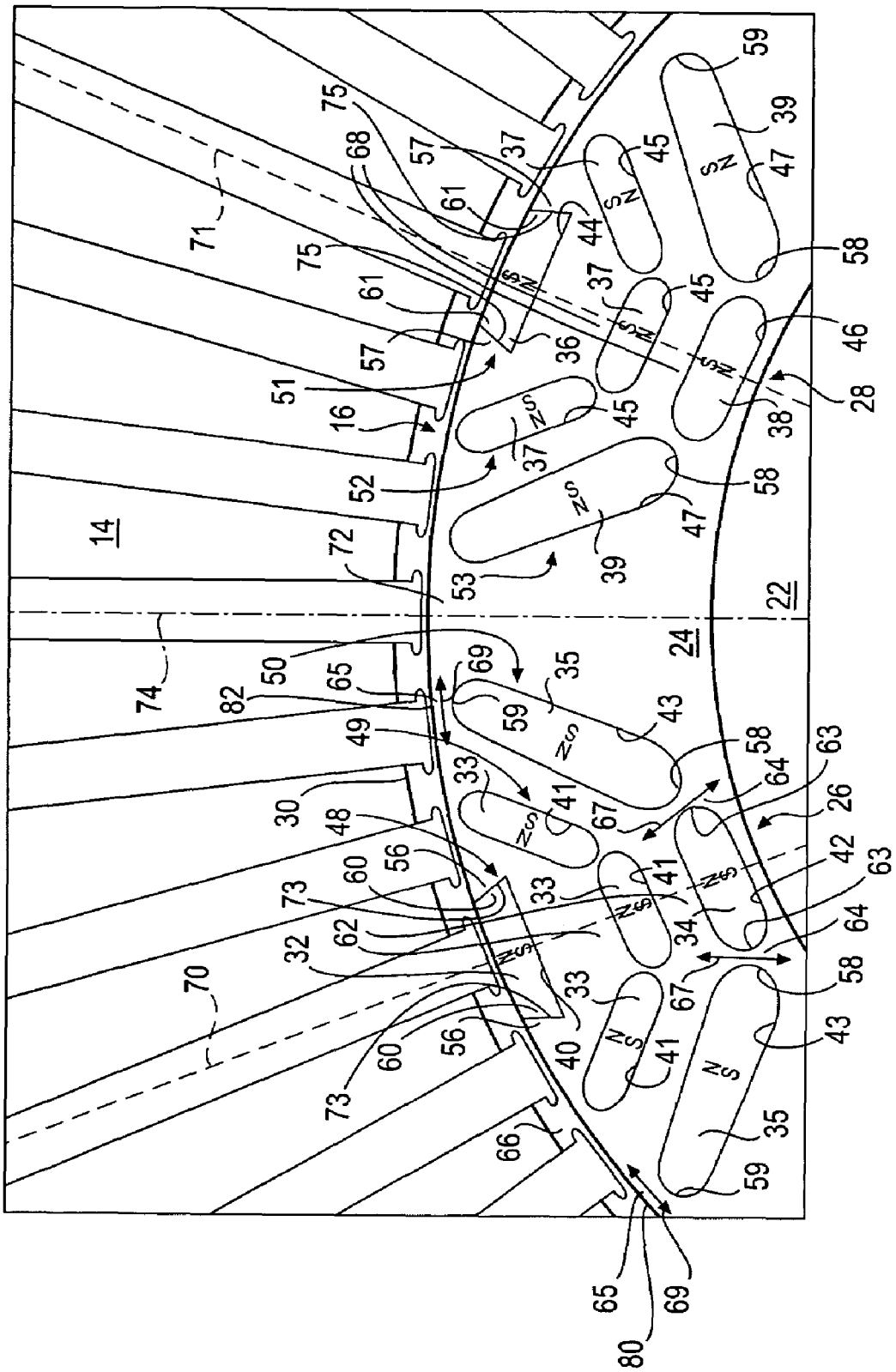
FIG. 2 is an enlarged view of the portion of FIG. 1 shown in rectangle 2 of FIG. 1.

FIG. 2 shows a pair of permanent-magnet clusters 26, 28 in greater detail. Permanent-magnet clusters 26 may include permanent magnets 32-35 each of which may be disposed in one of cavities 40-43 in rotor core 24. Permanent-magnet cluster 28 may include permanent magnets 36-39 disposed in cavities 44-47.

Permanent magnets 32-35 and permanent magnets 36-39 may form multiple permanent-magnet layers 48-50 and 51-53 of permanent-magnet cluster 26 and permanent-magnet cluster 28, respectively. As used herein, the term permanent-magnet layer refers to multiple permanent magnets arranged generally end-to-end or a single permanent magnet that is not arranged end-to-end with other permanent magnets. An inner permanent-magnet layer 50 of permanent-magnet cluster 26 may include permanent magnets 34, 35. Ends 58 of permanent magnets 35 and cavities 43 may be disposed adjacent opposite ends 63 of permanent magnet 34 and cavity 42. Between each end 63 of permanent magnet 34 and an adjacent end 58 of one of permanent magnets 35, a portion 64 of rotor core 24 may extend in a direction 67. From ends 58, permanent magnets 35 and cavities 43 may extend away from one another as they extend to ends 59 disposed adjacent portions 80, 82 of outer perimeter 30. Between each end 59 of one of permanent magnets 35 and outer perimeter 30 of rotor 16, a portion 65 of rotor core 24 may extend in a direction 69. An inner permanent-magnet layer 53 of permanent-magnet cluster 28, may include permanent magnets 38, 39 arranged similar to permanent magnets 34, 35.

Permanent magnets 33, 37 may form intermediate permanent magnet-layers 49, 52 of permanent-magnet clusters 26, 28, respectively. Intermediate permanent-magnet layer 49 may be configured similar to inner permanent-magnet layer 50, and intermediate permanent-magnet layer 49 may be disposed radially outward of inner permanent-magnet layer 50. Intermediate permanent-magnet layer 52 may be similarly configured and arranged within permanent-magnet cluster 28.

Permanent magnets 32, 36 may form outer permanent-magnet layers 48, 51 of permanent-magnet clusters 26, 28 respectively. Permanent magnet 32 may be disposed radially outward of at least a portion of inner permanent-magnet layer 50 and intermediate permanent-magnet layer 49. For example, permanent magnet 32 may be disposed radially outward of permanent magnet 34 of inner permanent-magnet layer 50 and radially outward of a middle one of permanent magnets 33 of intermediate permanent-magnet layer 49. Similarly, permanent magnet 36 may be disposed radially outward of at least a portion of inner permanent-magnet layer 53 and intermediate permanent-magnet layer 52. Additionally, each of cavities 40, 44 may be open on an outer radial side of rotor 16 such that permanent magnets 32, 36 disposed therein may each form a portion of outer perimeter 30 of rotor 16.

Rotor core 24 may include portions 56, 57 that overlap end portions 60, 61 of permanent magnets 32, 36. Within this disclosure, a portion of rotor core 24 is considered to overlap a portion of a permanent magnet if a radius of rotor 16 crosses both the portion of rotor core 24 and the portion of permanent magnet and the portion of rotor core 24 is disposed radially outside of the portion of the permanent magnet. End portions 60 of permanent magnet 32 may have end surfaces 73 that extend away from one another as they extend inward of outer perimeter 30 of rotor 16 into rotor core 24. End portions 61 of permanent magnet 36 may have end surfaces 75 similarly configured. Portions 56, 57 of rotor core 24 may be disposed directly adjacent end surfaces 73, 75 respectively. In addition to, or in place of, portions 56, 57 of rotor core 24 overlapping end portions 60, 61 of permanent magnets 32, 36, one or more portions of rotor core 24 may overlap other portions of permanent magnets 32, 36, such as middle portions thereof.

Each of permanent magnets 33-35, 37-39 may have a same shape and size as their host cavities 41-43, 44-47. As is shown in FIG. 2, permanent magnets 33-35, 37-39 and cavities 41-43, 44-47 may have straight sides and curved ends. Permanent magnets 33, 34, 37, 38 may have substantially constant width. In contrast, ends 58 of each of permanent magnets 35, 39 and cavities 43, 47 may be wider than ends 59 thereof.

As mentioned above, permanent-magnet cluster 26 may create a north magnetic pole of rotor 16. Permanent magnet 32 may have its north magnetic pole directed radially outward, and permanent magnets 33-35 may have their north magnetic poles generally facing outer perimeter 30 of rotor 16. Additionally, portions 62 of rotor core 24 located inside permanent-magnet cluster 26 may be magnetically isolated from other portions of rotor core 24 by inner permanent-magnet layer 50. Because permanent magnets 34, 35 have a low permeability to magnetic flux, permanent magnets 34, 35 greatly impede magnetic flux from flowing across them to enter or exit portions 62 of rotor core 18. Additionally, portions 64, 65 of rotor core 24 adjacent ends 58, 59 of permanent magnets 35 may be sufficiently narrow that they are highly saturated with magnetic flux from permanent magnets 34, 35. When highly saturated with magnetic flux, portions 64, 65 of rotor core 18 also have a low permeability to magnetic flux and, therefore, greatly impede magnetic flux from flowing through them to enter or exit portions 62 of rotor core 24. As a result, very little of the magnetic flux generated by the north magnetic poles of permanent magnets 34, 35 may leave permanent-magnet cluster 26 by flowing across permanent magnets 34, 35 or through portions 64, 65 of rotor core 24. So, nearly all of the magnetic flux generated by the north magnetic poles of permanent magnets 34, 35 may be forced to leave permanent-magnet cluster 26 by flowing substantially radially across air gap 66, into stator 14.

Additionally, as is mentioned above, permanent-magnet cluster 28 may create a south magnetic pole of rotor 16. Permanent-magnet cluster 28 may be configured similar to permanent-magnet cluster 26, except permanent magnets 36-39 may have their south magnetic poles, rather than their north magnetic poles, directed generally radially outward. Additionally, like inner permanent-magnet layer 50, inner permanent-magnet layer 53 may magnetically isolate portions 68 of rotor core 24 located inside permanent-magnet cluster 28 from other portions of rotor core 24.

In addition to creating north and south magnetic poles of rotor 16, permanent-magnet clusters 26, 28 may define the location of "d" axes 70, 71 of rotor 16, which are radial axes along which rotor 16 has its highest reluctance. Permanent magnets 32-39 may greatly impede magnetic flux created by other sources, such as stator 14, from flowing radially between outer perimeter 30 and hub/core interface 25 in portions of rotor core 24 occupied by permanent-magnet clusters 26, 28. On the other hand, a portion 72 of rotor core 24 located between permanent-magnet clusters 26 and 28 may provide a path through which magnetic flux may more readily flow in radial directions. As a result, "d" axes 70, 71 of rotor 16 may extend through permanent-magnet clusters 26, 28, and a "d" axis 74 of rotor 16, which is a radial axis along which rotor 16 has its lowest reluctance, may extend through portion 72 of rotor core 24. As is shown in FIG. 2, "d" axis 70 may extend across three permanent magnets 32-34, and "d" axis 71 may also extend across three permanent magnets 36-38.

In some embodiments, permanent-magnet clusters 26, 28 may be disposed at a sufficient distance from one another sufficient to prevent permanent-magnet clusters 26, 28 from saturating portion 72 of rotor core 24 with magnetic flux. For example, the spacing of permanent-magnet clusters 26, 28 shown in FIG. 2 prevents permanent-magnet clusters 26, 28 from saturating portion 72 of rotor core 24. For purposes of this disclosure, portion 72 of rotor core 24 may be considered not saturated with magnetic flux if the magnetic flux density therein is less than approximately 2 tesla.

Figure 3:
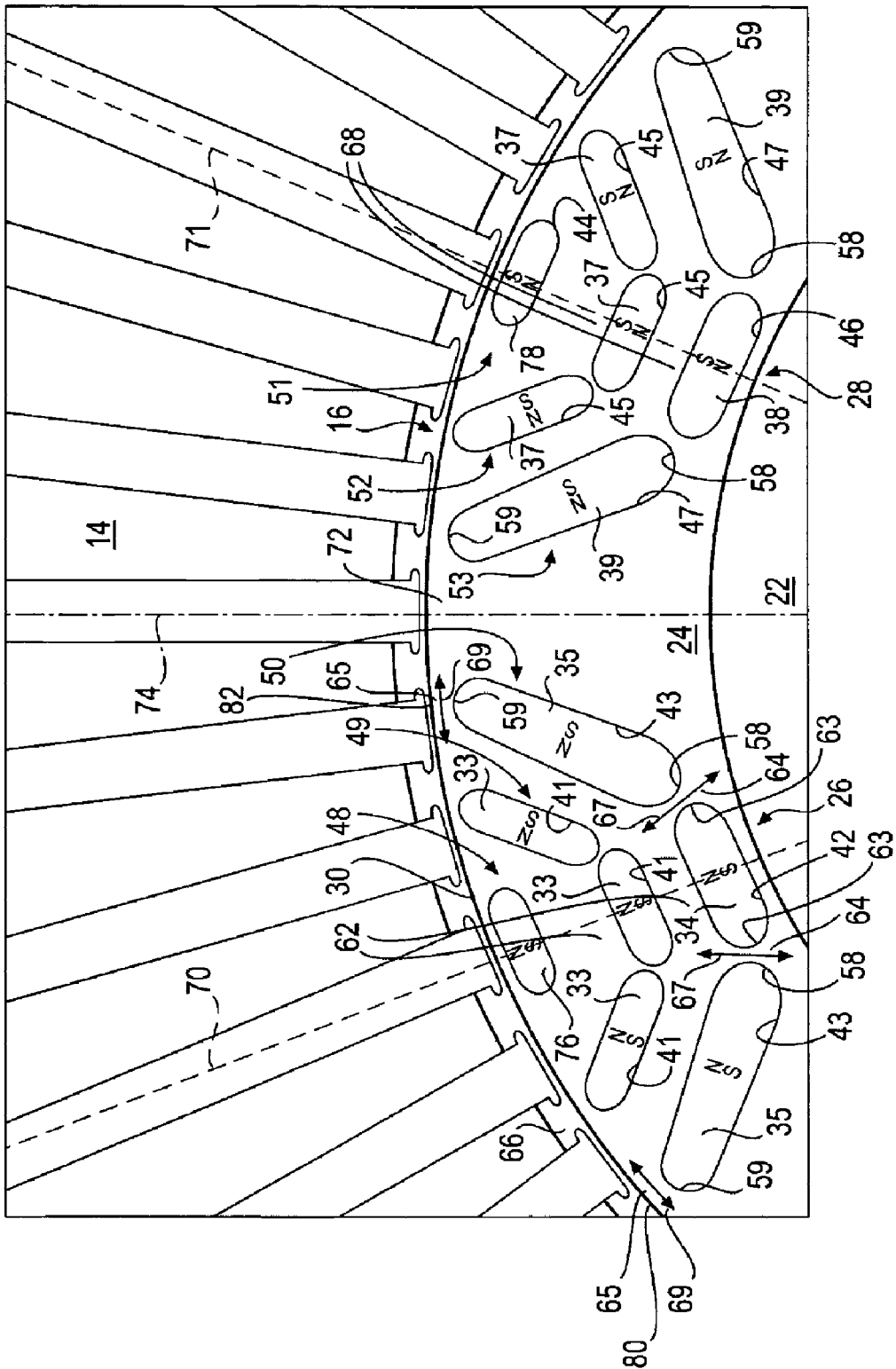
FIG. 3 is a sectional illustration of another embodiment of an electric machine according to the present disclosure.

FIG. 3 shows another embodiment of rotor 16 in electric machine 10. In the embodiment of rotor 16 shown in FIG. 3, permanent-magnet clusters 26, 28 may include permanent magnets 76, 78 forming outer permanent-magnet layers 48, 51 in place of permanent magnets 32, 36 of the embodiment shown in FIG. 2. In contrast to permanent magnets 32, 36 of FIG. 2, permanent magnets 76, 78 may be disposed entirely within rotor core 24. In other respects, the embodiment of rotor 16 shown in FIG. 3 may be the same as the embodiment of rotor 16 shown in FIG. 2.

Electric machine 10 is not limited to the configurations shown in FIGS. 1-3. For example, one or more of outer permanent-magnet layers 48, 51, intermediate permanent-magnet layers 49, 52, and inner permanent-magnet layers 50, 53 may be formed by more or less permanent magnets than shown in FIGS. 1-3. Additionally, one or more of permanent magnets 32-39 and/or cavities 40-47 may have different shapes. For example, one or more of permanent magnets 33 and 37 and cavities 41 and 45 may taper like permanent magnets 35, 39 and cavities 43, 47. Furthermore, permanent-magnet clusters 26, 28 may omit intermediate permanent-magnet layers 49, 52. Alternatively, permanent-magnet clusters 26, 28 may include additional permanent-magnet layers.

INDUSTRIAL APPLICABILITY

Rotor 16 may have application in any electric machine 10 configured to operate as an electric motor and/or an electric generator. The operation of an electric machine 10 as an electric motor is described below.

During operation of electric machine 10 as an electric motor, a rotating magnetic field produced by stator 14 may interact with rotor 16 and magnetic flux flowing from rotor 16 to cause a torque on rotor 16. The higher reluctance along "d" axes 70, 71 than along "q" axis 74 of rotor 16 creates a tendency for rotor 16 to align itself with the rotating magnetic field created by stator 14. This tendency is known as a reluctance torque on rotor 16. The magnitude of the reluctance torque may be positively correlated to a difference between the reluctance of rotor 16 along "d" axes 70, 71 and the reluctance of rotor 16 along "q" axis 74. Additionally, magnetic flux flowing from permanent-magnet clusters 26 of rotor 16, through stator 14, to permanent-magnet clusters 28, interacts with the rotating magnetic field created by stator 14 and causes a magnet torque on rotor 16. The magnet torque on rotor 16 is positively correlated with the quantity of magnetic flux flowing from permanent-magnet clusters 26, through stator 14, to permanent-magnet clusters 28. The total torque on rotor 16 equals the sum of the reluctance torque and the magnet torque.

The disclosed embodiments of rotor 16 may cause a high reluctance torque on rotor 16 when electric machine 10 is operated as an electric motor. Each permanent-magnet layer 48-50 may increase the reluctance of rotor 16 along "d" axis 70, and each permanent-magnet layer 51-53 may increase the reluctance of rotor 16 along "d" axis 71. Additionally, spacing permanent-magnet clusters 26, 28 such that they do not saturate portion 72 of rotor core 24 with magnetic flux may contribute to rotor 16 having a low reluctance along "q" axis 74. Thus, the disclosed embodiments of rotor 16 may have a large difference between the reluctance along each "d" axis 70, 71 and the reluctance along "q" axis 74, which may cause a high reluctance torque on rotor 16.

Additionally, the disclosed embodiments of rotor 16 may provide a high magnet torque. Each of permanent-magnet layers 48-53 increases the quantity of magnetic flux that flows from rotor 16 through stator 14. Additionally, placing permanent magnets 32, 36 on outer perimeter 30 of rotor 16 may contribute to rotor 16 having a strong magnetic field. With permanent magnets 32, 36 so disposed, magnetic flux may flow from the north magnetic pole of permanent magnet 32, through stator 14, to the south magnetic pole of permanent magnet 36, without being diminished by rotor core 24.

Additionally, the disclosed embodiments of rotor 16 may have certain structural advantages. For example, by overlapping end portions 60, 61 of permanent magnets 32, 36, portions 56, 57 of rotor core 24 may prevent centrifugal forces on permanent magnets 32, 36 from detaching permanent magnets 32, 36 from rotor core 24 during rotation of rotor 16. Additionally, portions 64, 65 may share the burden of counteracting centrifugal forces on portions 62 of rotor core 24. This may limit the amount of stress that rotation of rotor 16 causes in any one of portions 64, 65 of rotor core 24.

Furthermore, analysis has shown that centrifugal forces on portions 62 of rotor core 24 may create higher stresses in portions 64 of rotor core 24 than in portions 65 of rotor core 24. This may be so at least partially because directions 67 in which portions 64 extend are more radially oriented than directions 69 in which portions 65 extend, which causes a greater amount of strain in portions 64 than in portions 65 for any given amount of radial displacement of portions 62 of rotor core 24. Making ends 58 of cavities 43 and permanent magnets 35 relatively wide may reduce the stress concentrations created by ends 58 of cavities 43, which may reduce the relatively high stresses in portions 64 of cavities 43. Similar benefits accrue from making ends 58 of cavities 47 relatively wide.

Moreover, the disclosed embodiments may have certain cost advantages. For instance, making ends 59 of permanent magnets 35, 39 relatively narrow may keep the cost of permanent magnets 35, 39 low. Additionally, constructing permanent magnets 33-35, and 37-39 with straight sides may keep the costs of permanent magnets 33-35 and 37-39 low.

It will be apparent to those skilled in the art that various modifications and variations can be made in the disclosed electric machine 10 and rotor 16 without departing from the scope of the disclosure. Other embodiments of the disclosed electric machine 10 and rotor 16 will be apparent to those skilled in the art from consideration of the specification and practice of the electric machine 10 and rotor 16 disclosed herein. It is intended that the specification and examples be considered as exemplary only, with a true scope of the disclosure being indicated by the following claims and their equivalents.

What is claimed is:

1. A rotor for an electric machine, comprising:
    a rotor core constructed of magnetically-permeable material; and
    a permanent-magnet cluster creating a first magnetic pole of the rotor, the permanent-magnet cluster being composed of permanent magnets mounted to the rotor core, including
        a first permanent magnet having substantially radial magnetic polarity,
        a second permanent magnet having a first end disposed adjacent a first end of the first permanent magnet with a first portion of the rotor core disposed therebetween, and
        a third permanent magnet having a first end disposed adjacent a second end of the first permanent magnet with a second portion of the rotor core disposed therebetween; and
        a fourth permanent magnet having substantially radial magnetic polarity forming at least a portion of an outer perimeter of the rotor, the fourth permanent magnet being disposed radially outward of at least a portion of at least one of the first permanent magnet, the second permanent magnet, and the third permanent magnet, wherein the first permanent magnet and the fourth permanent magnet cooperate to generate radial magnetic flux.

2. The rotor of claim 1, wherein:
    the first permanent magnet, the second permanent magnet, and the third permanent magnet form at least a portion of an inner permanent-magnet layer;
    the fourth permanent-magnet forms at least a portion of an outer permanent-magnet layer; and
    the permanent-magnet cluster includes an intermediate permanent-magnet layer, the intermediate permanent-magnet layer being disposed radially outward of the inner permanent-magnet layer and at least a portion of the intermediate permanent-magnet layer being disposed radially inward of the fourth permanent magnet.

3. The rotor of claim 2, wherein a radial axis along which the rotor has its maximum reluctance extends across the first permanent magnet, a permanent magnet of the intermediate-permanent-magnet layer, and the fourth permanent magnet.

4. The rotor of claim 1, further including:
    at least one additional permanent magnet mounted to the rotor core, the additional permanent magnet creating at least one additional magnetic pole of the rotor; and
    the permanent-magnet cluster being disposed at a distance from the additional permanent magnet such that the permanent-magnet cluster and the additional permanent magnet create a magnetic flux density less than approximately 2 tesla in a portion of the rotor core between the permanent-magnet cluster and the additional permanent magnet.

5. The rotor of claim 1, wherein:
    the first end of the second permanent magnet is curved;
    the first end of the second permanent magnet is wider than a second end of the second permanent magnet; and
    the first end of the third permanent magnet is curved and is wider than a second end of the third permanent magnet.

6. The rotor of claim 5, wherein:
    the second end of the second permanent magnet is disposed adjacent the outer perimeter of the rotor; and
    the second end of the third permanent magnet is disposed adjacent the outer perimeter of the rotor.

7. The rotor of claim 1, wherein:
    the second end of the second permanent magnet is disposed adjacent a first portion of an outer perimeter of the rotor;
    the second end of the third permanent magnet is disposed adjacent a second portion of an outer perimeter of the rotor; and
    the fourth permanent magnet is disposed between the second end of the second permanent magnet and the second end of the third permanent magnet.

8. The rotor of claim 1, wherein at least one portion of the rotor core overlaps at least one portion of the fourth permanent magnet.

9. The rotor of claim 1, wherein:
    the first permanent magnet, the second permanent magnet, and the third permanent magnet form at least a portion of a permanent-magnet layer of the permanent-magnet cluster; and
    the permanent-magnet layer is configured in a manner to magnetically isolate portions of the rotor core located within the permanent-magnet cluster from other portions of the rotor core.

10. The rotor of claim 9, wherein:
    the permanent-magnet cluster creates a north magnetic pole;
    the first permanent magnet, the second permanent magnet, and the third permanent magnet each have a north magnetic pole generally facing the outer perimeter of the rotor; and
    the fourth permanent magnet has a north magnetic pole directed radially outward.

11. The rotor of claim 9, wherein:
    the permanent-magnet cluster creates a south magnetic pole;
    the first permanent magnet, the second permanent magnet, and the third permanent magnet each have a south magnetic pole generally facing the outer perimeter of the rotor; and
    the fourth permanent magnet has a south magnetic pole directed radially outward.

12. A rotor for an electric machine, comprising:
    a rotor core constructed of magnetically-permeable material;
    a plurality of permanent magnets mounted to the rotor core, including:
        a permanent-magnet cluster that creates a magnetic pole of the rotor, the permanent-magnet cluster including:
            at least one outer permanent magnet that forms at least a portion of an outer perimeter of the rotor, wherein at least a portion of the rotor core overlaps at least a portion of the outer permanent magnet and the at least one outer permanent magnet has end surfaces that extend away from one another as they extend inward from the outer perimeter of the rotor into the rotor core;

at least one inner permanent magnet, wherein at least a portion of the inner permanent magnet is disposed radially inward of the outer permanent magnet;

wherein the plurality of permanent magnets mounted to the rotor core includes at least one additional permanent magnet disposed adjacent the permanent-magnet cluster, the additional permanent magnet creating a second magnetic pole of the rotor; and wherein the additional permanent magnet and the permanent-magnet cluster are disposed at a distance from one another such that the permanent-magnet cluster and the additional permanent magnet create a magnetic flux density less than approximately 2 tesla in a portion of the rotor core disposed between the permanent-magnet cluster and the additional permanent magnet.

13. The rotor of claim 12, wherein the portion of the rotor core that overlaps a portion of the outer permanent magnet overlaps an end portion of the outer permanent magnet.

14. The rotor of claim 13, wherein:

the plurality of permanent magnets mounted to the rotor core includes at least one additional permanent magnet disposed adjacent the permanent-magnet cluster, the additional permanent magnet creating a second magnetic pole of the rotor; and the additional permanent magnet and the permanent-magnet cluster are disposed at a distance from one another such that the permanent-magnet cluster and the additional permanent magnet create a magnetic flux density less than approximately 2 tesla in a portion of the rotor core disposed between the permanent-magnet cluster and the additional permanent magnet.

15. The rotor of claim 12, wherein:

the at least one inner permanent magnet of the permanent-magnet cluster forms at least a portion of an inner permanent-magnet layer of the permanent-magnet cluster; and the inner permanent-magnet layer is configured to magnetically isolate portions of the rotor core located inside the permanent-magnet cluster from portions of the rotor core outside the permanent-magnet cluster.

16. The rotor of claim 15, wherein:

the permanent-magnet cluster creates a north magnetic pole of the rotor; and each permanent magnet of the inner permanent-magnet layer has a north magnetic pole generally facing the outer perimeter of the rotor.

17. The rotor of claim 12, wherein:

the at least one inner permanent magnet forms forms at least a portion of an inner permanent-magnet layer; and each permanent magnet of the inner permanent-magnet layer has straight sides.

18. The rotor of claim 12, wherein:

the permanent-magnet cluster creates a north magnetic pole of the rotor; and the outer permanent magnet has a north magnetic pole directed radially outward.

19. The rotor of claim 12, wherein:

the permanent-magnet cluster creates a south magnetic pole of the rotor; and the outer permanent magnet has a south magnetic pole directed radially outward.

20. The rotor of claim 12, wherein a radial axis of the rotor along which the rotor has its highest reluctance extends across the outer permanent magnet and the inner permanent magnet.

* * * * *